Patented Mar. 12, 1974

3,796,667
METHOD FOR INHIBITING IRON CONTAINING SCALE FORMATION IN SEAWATER DISTILLATON PLANTS
Jacob Block, Rockville, Md., and Bruce Morgan Watson, Vienna, Va., assignors to W. R. Grace & Co., New York, N.Y.
No Drawing. Filed June 2, 1972, Ser. No. 259,245
Int. Cl. C02b 5/06
U.S. Cl. 252—180                      2 Claims

ABSTRACT OF THE DISCLOSURE

A process for prevention of increased fouling due to the presence of iron in saline water distillation plants by adding certain iron specific chelating agents to the saline water being fed to the distillation unit to inhibit the formation of iron containing deposits. These deposits are extremely heat flow resistant.

BACKGROUND OF THE INVENTION

Various methods for removing salt from seawater have been developed over the years to relieve the scarcity of freshwater in many parts of the world. In addition, the ships at sea have been utilizing seawater as a source of drinking water for some time. One of the principal methods of purifying seawater is through the use of various types of evaporators such as flash evaporators, thin film distillation evaporators and submerged tube evaporators.

Seawater contains a substantial amount of scale-forming compounds. Two types of scale are most prevalent on the heat transfer surfaces on seawater evaporators. The alkaline scales (calcium carbonate and magnesium hydroxide) and calcium sulfate.

Calcium sulfate has a significant solubility in seawater at ambient temperatures, but the solubility of the two forms of interest (anhydrite ($CaSO_4$) and hemihydrate ($CaSO_4 \cdot \frac{1}{2}H_2O$) falls with increasing temperature. Above 38° C., the stable form of calcium sulfate is anhydrite, but nucleation from seawater concentrates does not occur readily and the solubility limit of the metastable hemihydrate generally applies in seawater evaporators. However, at conditions generally applicable to flash evaporators (brine concentration factor of 2 and top operating temperatures of 200–250° F.), the solubility of all forms of calcium sulfate is not exceeded.

The alkaline scales result from bicarbonate ions formed in seawater by dissolution of atmospheric carbon dioxide. When seawater is heated, bicarbonate ion decomposes with evolution of carbon dioxide gas. Carbonate ion is formed in this reaction. The carbonate ions formed can take part in two competing equilibria. Calcium carbonate can precipitate if the solubility product is exceeded or upon further heating the carbonate ion hydrolyses to hydroxyl ion with further evolution of carbon dioxide. Magnesium hydroxide will precipitate if the solubility product is exceeded.

One of the methods used to prevent alkaline scale deposition is treatment of the feed with sulfuric acid. This method requires a degree of technical sophistication on the part of the operators which may not be available in certain underdeveloped countries. In addition, the handling and storing of large quantities of acid poses some problems.

The use of polyphosphate-lignosulfonate mixture as alkaline scale preventives has been disclosed previously. The use of these materials is discussed at length in U.S. Pat. 2,782,162 to Lidell. However, these materials are only effective when the operating temperature of the system is below 195° F. If the temperature exceeds 195° F., the polyphosphate is hydrolyzed to orthophosphate. The presence of orthophosphate results in the formation of a calcium phosphate sludge.

Certain polyelectrolytes such as the material commercially available as Darex 40 (25% solution of sodium (polymethacrylate), NaPMA) have been effective in preventing calcium carbonate scale at temperatures as high as 240° F. These additives are added in minute concentration (1–3 parts per million). Thus, their effect is not chemical. Their activity is connected to a physical adsorption mechanism which inhibits nucleation and/or crystal growth. It is believed that the crystallization process is delayed and that distortion of the crystal lattice also occurs.

As stated, sodium polymethacrylate can be effective at temperatures up to about 240° F. when the feed water is not concentrated during the heating process. However, almost all new seawater distillation plants use brine recirculation, which results in concentration factors up to 2:1 or up to 70,000 p.p.m. total dissolved solids. The sodium polymethacrylate is still effective in preventing calcium carbonate scale, but magnesium hydroxide scale is now formed because the solubility product is exceeded at these concentrations. When NaPMA is used alone, to maintain acceptable scale inhibition at 70,000 parts per million total dissolved solids concentration, the temperature must be limited to 200° F.

Yet another type of fouling occurs in the presence of iron. Small quantities of iron (0.2 part per million or greater) in the recirculating brine can lead to extreme fouling conditions when operating a seawater distillation plant using threshold treatment for inhibiting precipitation of $CaCO_3$. On analysis of scale formed in operation of these plants, it was found that the scale brugnatellite ($Mg_6FeCO_3(OH)_{13} \cdot 4H_2O$) was formed when the iron was in the ferric state and ferroan dolomite $$(CaMg_{0.67}Fe_{0.33})(CO_3)_2$$

was formed when the iron was in the ferrous state. Other scales not yet identified may also be formed.

BRIEF DESCRIPTION OF THE INVENTION

We have found that the formation of these iron containing compounds can be prevented by using chelating agents having a high stability for ferric iron (grugnatellite) or ferrous iron (ferroan dolomite).

Examples of suitable chelating compounds include: ethylene diamine N,N'-di-(orthohydroxyphenyl acetic acid), N,N'-di(2-hydroxybenzyl) ethylenediamine-N,N' diacetic acid, N,N'-bis-(2-hydroxy-3,5-dimethylbenzyl) ethylenediamine diacetic acid, N,N'-bis-(2-hydroxy-5-sulfobenzyl) ethylenediamine diacetic acid and related compounds.

The most effective chelating agents are ethylene bis-(alpha-imino-ortho-hydroxyphenylacetic acid) described in U.S. Pat. 3,005,848 (EDDHA), and similar compounds, such as alkylene or cycloalkylene diamine diacetic acids, for example.

DETAILED DESCRIPTION OF THE INVENTION

The composition of seawater, of course, varies depending on the location. An average seawater has the following composition in parts per million:

| | |
|---|---:|
| Calcium | 410 |
| Magnesium | 1,300 |
| Sodium | 10,800 |
| Potassium | 300 |
| Chloride | 19,450 |
| Sulfate | 2,700 |
| Total alkalinity | 90–150 |
| Total solids | 35,165 |

The pH of seawater varies from 7.5 to 8.2. It is obvious from this analysis that seawater in addition to sodium chloride contains substantial amounts of both calcium and magnesium.

When a seawater distillation unit is operated at a temperature of 105°–110 C., at a maximum total solids concentration of 70,000 parts per million in the presence of a calcium scale inhibitor such as NPMA and in the presence of small amounts, in the order of 0.2 to 4 parts per million of iron, extensive fouling of the heating surfaces results. This fouling causes a rapid decrease in the heat transfer coefficient.

Analysis of the scale that results from operation of the unit under these conditions revealed the presence of brucite ($Mg(OH)_2$) and brugnatellite if ferric iron is present and brucite and ferroan dolomite if ferrous iron is present. We have found that brugnatellite or ferroan dolomite is formed in seawater distillation plants only when operating on a calcium carbonate supressing additive such as polymethacrylic acid or polyacrylic acid and the alkali metal or ammonium salts thereof.

We have also found that only chelating agents with high stability for iron-(III) and iron-(II) can prevent the formation of brugnatellite and ferroan dolomite, respectively. EDTA and NTA are not effective for this.

While the amount of inhibitor added to the saline water depends to some extent on the characteristics of the distillation unit, the seawater and the inhibitor, we have found that about 1–25 parts per million (based on and added to the saline water feed) is a satisfactory concentration. Larger amounts are also effective, but the cost is prohibitive for most uses. The iron chelate may be added to any other point in the recirculative brine system alone as a pretreatment, and need not be added in combination with other additives.

When the chelant is combined with a second inhibitor, the combined concentration is preferably maintained in the range of 1–25 parts per million, with 1–15 parts per million of chelating agent and 1–5 parts of polymethacrylic or polyacrylic acid being preferred.

Our invention is further illustrated by the following specific but nonlimiting examples.

EXAMPLE I

A run was made in a seawater distillation pilot plant operated at a top temperature of 106° C. with a maximum total dissolved solids concentration of 70,000 parts per million. Sodium polymethacrylate was added to the feed at a concentration of 3 parts per million. Total iron content of the recirculating brine was less than 0.2 p.p.m.

The heater tubes of the distillation plant fouled after 348 hours of operation with an increase in heat transfer resistance coefficient of $0.45 \times 10^{-6}$ R units per hour (R unit=hr.-m.$^2$-° C./Kcal.). X-ray diffraction analysis of the scale removed from the tubes of the unit revealed only brucite ($Mg(OH)_2$).

The run was repeated with identical conditions except that iron was added to give a total iron concentration in the brine of 3 parts per million. Fouling rate was $6.3 \times 10^{-6}$ R units per hour, or 14 times that of the previous run. X-ray analysis of the scale from the tubes revealed brucite and brugnatellite.

EXAMPLE II

Brugnatellite was prepared and identified in the laboratory using the following technique:

A synthetic seawater concentrate was made up by dissolving 350 grams of sodium chloride, 110 grams of magnesium chloride ($MgCl_2 \cdot 6H_2O$) and 11 grams of calcium chloride in 5 liters of deionized water. A total of 400 ml. of this concentrate was diluted to 800 ml. with deionized water, followed by the addition of 0.8 ml. of sodium carbonate solution (5.3 grams of sodium carbonate in 100 ml.), and 6.4 ml. of iron chloride solution (0.48 gram of $FeCl_3 \cdot 6H_2O$ per 100 ml.) yielding a final iron concentration of 8 parts per million. The pH of the resulting solution was adjusted to 9.3 with 0.1 normal NaOH. A coupon of a copper-nickel alloy containing 90% copper and 10% nickel was placed in the beaker to collect any scale that formed.

The solution was heated to boiling and 1.1 ml. of 0.1 normal NaOH was added. The solution was then boiled to ½ the original volume, cooled and filtered. The precipitate was dried to 70° C. The scale was identified by its X-ray diffraction pattern as brugnatellite, which when examined microscopically, appear as large white gelatinous deposits.

EXAMPLE III

The effectiveness of the use of an iron chelating agent in inhibiting the deposit of brugnatellite scale was demonstrated in a run using a synthetic seawater concentrate under laboratory conditions.

A synthetic seawater concentrate was made up by dissolving 350 grams of sodium chloride, 110 grams of magnesium chloride ($MgCl_2 \cdot 6H_2O$) and 11 grams of calcium chloride in 5 liters of deionized water. A total of 400 ml. of this concentrate was diluted to 800 ml. with deionized water followed by addition of 0.8 ml. of sodium carbonate solution (5.3 grams of sodium carbonate in 100 ml.) and 6.4 ml. of iron chloride solution, (0.48 gram of

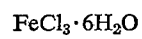
$FeCl_3 \cdot 6H_2O$ per 100 ml.), yielding a final iron concentration of 8 parts per million. The pH of the resulting solution was adjusted to 9.3 with 0.1 normal sodium hydroxide solution. A coupon of copper-nickel alloy containing 90 percent copper and 10 percent nickel was placed in the beaker to collect any scale that formed.

The solution was heated to boiling and 1.1 ml. of 0.1 normal sodium hydroxide solution and a sufficient quantity of EDDHA, to bring the level to 7 parts per million, were added. The solution was then boiled to ½ its original volume, cooled and filtered. The precipitate was dried at 70° C. and examined by X-ray diffraction. Only a faint trace of brugnatellite was detected in the scale.

EXAMPLE IV

This test illustrates the use of an iron chelating agent to prevent the formation of ferroan dolomite, and was carried out in the pilot plant unit described in Example I.

The plant was again operated at a top temperature of 106° C. with an equilibrium brine concentration of 70,000 p.p.m. TDS. The ferrous iron concentration in the recirculating brine was maintained at 1–2 parts per million and to the seawater make-up was added 3 parts per million of NaPMA. The fouling rate of the unit was $5.6 \times 10^{-6}$ R units per hour (R unit=hr.-m.$^2$-° C./Kcal.). The scale was examined by X-ray diffraction analysis and found to be a combination of brucite ($Mg(OH)_2$) and ferroan dolomite ($Ca(Mg_{0.67}Fe_{0.33})(CO_3)_2$). Thus, the presence of ferrous iron increased the fouling rate from $0.45 \times 10^{-6}$ R units (a similar run with no ferrous iron) to $5.6 \times 10^{-6}$ R units or by a factor of 12.4.

The effectiveness of EDDHA, ethylene diamine di-(O-hydroxy phenylacetic acid) in inhibiting ferroan dolomite formation was determined. The EDDHA was added at a concentration of 10 parts per million. When the unit was operated with this concentration of additive, the fouling rate was reduced to $1.3 \times 10^{-6}$ R units per hour.

The scale deposited was examined by X-ray diffraction and found to be made up of only magnesium hydroxide ($Mg(OH)_2$). No ferroan dolomite was detected. The fouling rate values approached the values obtained in the runs in which no ferrous iron was added and the seawater contained no chelating agent.

What is claimed is:

1. A process for inhibiting the deposition of scales onto the heat exchanger surfaces of a saline water evaporator which comprises, adding to said saline water, about 1–25 parts per million of:
(a) a compound specific for chelating iron selected from the group consisting of ethylene diamine N,N'-di-(orthohydroxyphenylacetic acid), N,N'-bis-(2-hydroxy-3,5-dimethylbenzyl)ethylene diamine diacetic acid, N,N'-bis-(2-hydroxy-5-sulfobenzyl)ethylenediamine diacetic acid, and N,N-di-(2-hydroxybenzyl)ethylenediamine-N,N'-diacetic acid, in combination with
(b) a calcium carbonate suppressing additive selected from the group consisting of polyacrylic acid, its alkali metal and ammonium salts, and polymethacrylic acid and its alkali metal and ammonium salts to inhibit the formation of iron and magnesium containing scale.

2. The process according to claim 1 wherein the calcium carbonate suppressing additive is present in a concentration of 1 to 5 parts per million and the compound specific for chelating iron is present in a concentration of 1 to 15 parts per million.

References Cited
UNITED STATES PATENTS

| | | | |
|---|---|---|---|
| 3,099,521 | 6/1963 | Arensberg | 252—181 |
| 3,110,679 | 11/1963 | Rubin | 252—181 |
| 2,783,200 | 2/1957 | Crum et al. | 252—82 |
| 3,293,152 | 12/1966 | Herbert et al. | 252—82 |
| 3,578,589 | 5/1971 | Hwa et al. | 252—82 |
| 3,514,376 | 5/1970 | Salutsky | 210—58 |
| 2,980,610 | 4/1961 | Ruehrwein | 252—180 |
| 3,308,065 | 3/1967 | Lesinski | 252—82 |

MAYER WEINBLATT, Primary Examiner

J. WARE, Assistant Examiner

U.S. Cl. X.R.

210—58; 252—82